United States Patent

[11] 3,566,997

[72] Inventor Burnette Heck
    Bloomfield Hills, Mich.
[21] Appl. No. 829,348
[22] Filed June 2, 1969
[45] Patented Mar. 2, 1971
[73] Assignee General Motors Corporation
    Detroit, Mich.

[54] BRAKE-ADJUSTING MECHANISM
    6 Claims, 3 Drawing Figs.
[52] U.S. Cl. .................................................. 188/196,
    188/71.8
[51] Int. Cl. ............................................ F16d 65/54,
    F16d 55/46
[50] Field of Search ........................................ 188/71.8,
    196P

[56] References Cited
    UNITED STATES PATENTS
    2,746,254  5/1956  Lucien ..................... 188/196(P)X
    3,277,983  10/1966 Jeffries .................... 188/196(P)

Primary Examiner—Duane A. Reger
Attorneys—W. E. Finken and D. D. Mc Graw

ABSTRACT: An annular brake piston is provided with a sheet metal cylinder press fitted onto one surface of the piston and arranged to move with the piston for a limited distance. If the required movement of the piston exceeds the limited distance, further movement of the sheet metal cylinder is prevented while the additional movement of the piston still occurs. This causes a readjustment of the press fitted position of the cylinder on the piston, and when the piston returns to the released position it is prevented from returning as far as before. The surface of the piston on which the cylinder has been press fitted is provided with relief recesses spaced circumferentially so that the desired resistance to slip may be obtained without requiring close tolerance dimensions to be held.

PATENTED MAR 2 1971 3,566,997

INVENTOR.
Burnette Heck
BY
D.D. McGraw
ATTORNEY

BRAKE-ADJUSTING MECHANISM

The invention relates to a brake-adjusting mechanism and more particularly to one in which the adjusting mechanism is associated with the brake-actuating piston. When utilized in a liquid-cooled disc brake of the type illustrated, the piston is an annular piston and is positioned in a cylinder for movement in the brake housing to compress the disc pack and therefore energize the brake. The piston is provided with a peripheral surface which has circumferentially spaced reliefs or recesses formed therein. These surfaces may be formed on an interior or exterior peripheral surface of the piston. A sheet metal cylinder is press fitted over the relieved surface so that it is in gripping relation with the piston. The sheet metal cylinder on the interior of the piston may be provided with an outwardly turned flange which provides a stop for the cylinder. When the piston exceeds the permitted movement during brake energization, the stop flange engages a portion of the brake housing, preventing further movement of the adjusting cylinder. Since the hydraulic actuating pressure of the piston is sufficiently high to continue piston movement, slippage occurs between the adjusting cylinder and the piston so that these two elements assume a different adjusted relationship. A generally similar arrangement may be provided on the outer peripheral surface of the piston. This construction permits an adjusting mechanism to be constructed with one additional part, the cylindrical adjuster, and to be installed quickly and easily without requiring close tolerance limitations.

Figures 1, 2, 3:
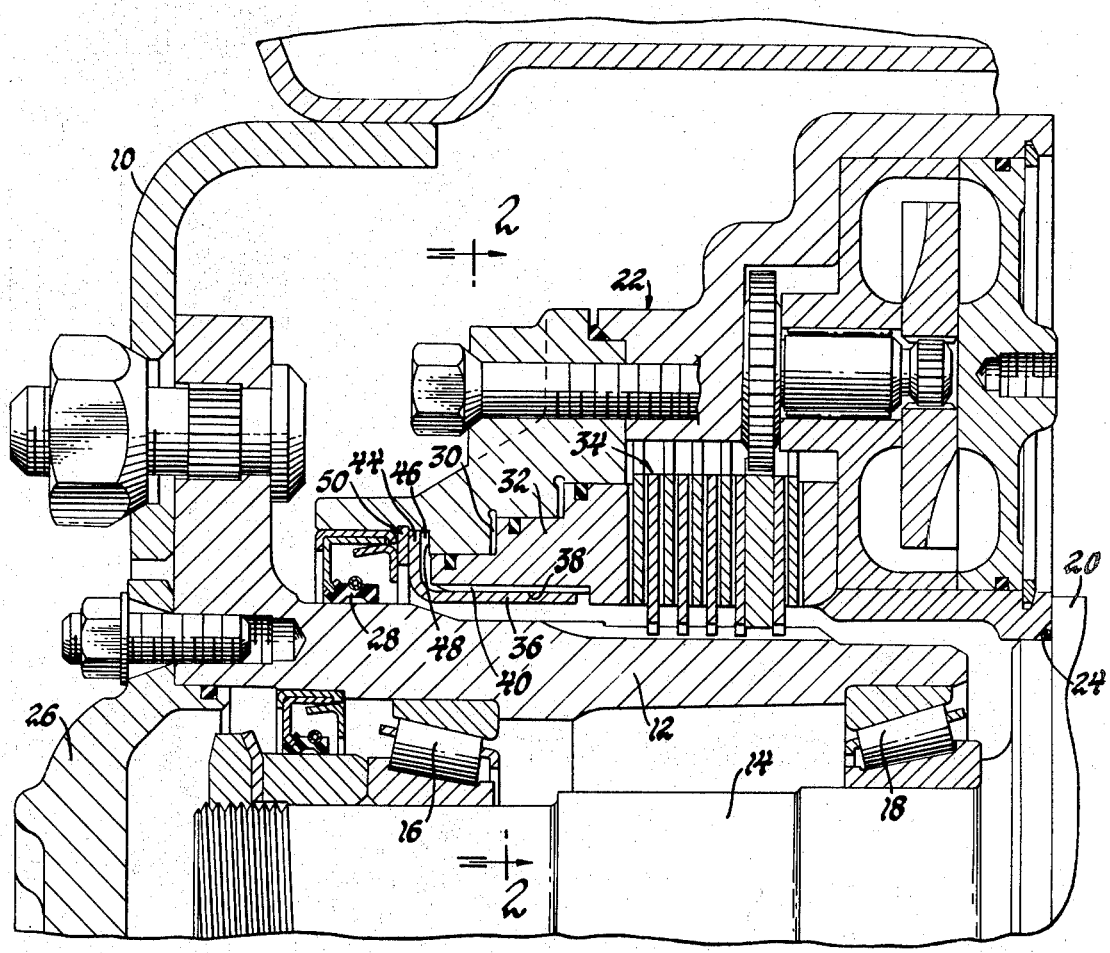
FIG. 1 is a cross-sectional view of a liquid cooled disc brake embodying the invention, and having parts being broken away.
FIG. 2 is a cross-sectional view of a fragmentary portion of the adjusting mechanism, as taken in the direction of arrows 2—2 of FIG. 1.
FIG. 3 is a fragmentary cross-sectional view of a modification of the adjusting mechanism of FIG. 1.

In the construction illustrated, the vehicle wheel 10 is secured for rotation with a hub 12. The hub is mounted on a stub axle 14 by means of suitable bearings 16 and 18. The stub axle 14 is a part of the support assembly 20, which may be the steering knuckle of a front vehicle wheel or a suitable portion of the axle assembly of a rear vehicle wheel. The brake housing 22 is sealed relative to the hub 12 by means of seals 24 and 28. A cap 26 seals the interior of the hub 12 so as to prevent leakage of cooling liquid. The housing 22 has a chamber 30 formed therein and receiving the actuating piston 32. This piston is positioned so that when hydraulic pressure is introduced in the chamber 30 it will move to the right, as seen in the drawing, to compress the disc pack 34 and energize the brake.

In the construction shown in FIGS. 1 and 2, the adjusting cylinder or ring 36 is press fitted on an inner peripheral surface 38 of the piston 32. The surface 38 is provided with relief recesses 40 so that the cylinder 36 actually engages the surface 38 along spaced circumferential areas 42. This permits the cylinder to expand slightly into the recesses without appreciably changing the force required to move the cylinder relative to the piston. The outer end of cylinder 36 is provided with an outwardly turned flange 44 which extends into a recess 46 formed by a shoulder 48 of the housing 22, and the retaining ring 50, fitted into a portion of the housing 22. The relative axial positions of retaining ring 50 and shoulder 48 define the distance between their facing surfaces which in turn defines the amount of movement of piston 32 which is permitted without adjustment. Shoulder 48 and retaining ring 50 also cooperate with flange 44 to adjust the mechanism when necessary and then position the piston 32 in the new, adjusted, position.

It can be seen that as piston 32 moves to the right in the brake energizing direction, flange 44 also moves to the right in recess 46. If sufficient piston movement is required to permit the flange 44 to engage shoulder 48, and still further piston movement is then required to fully apply the brake, the cylinder 36 is prevented from further movement. However, the pressure of the brake fluid in chamber 30 is sufficient to continue movement of piston 32 to the right, causing the piston to slip relative to the cylinder 36. When the pressure in chamber 38 is released and piston 32 is moved to the left by suitable piston return means, cylinder 36 moves with it until flange 44 engages retaining ring 50. This effectively prevents further releasing movement of both the cylinder and the piston. Thus the piston is positioned in its newly adjusted position.

In the construction of FIG. 3, the housing 52 is provided with a pressurizing chamber 54 in which piston 56 is movably received. When the piston is moved to the right, it compresses disc pack 58 to energize the brakes. The outer peripheral surface 60 of the piston receives a band or cylinder 62 in press fitted relation in a manner similar to the press fit on cylinder 36 about the inner surface 38 of piston 32 in FIGS. 1 and 2. The axial length of the adjusting band or cylinder 62 is as much as or more than the axial length of the piston surface 60. A shoulder 64 is provided as a part of the brake housing 52 and is engageable with a side surface of the band 62 when the piston is moved to the brake released position. An annular Belleville spring 66 is positioned with its outer periphery engaging a shoulder 68 formed as a part of housing 52. Its inner periphery engages one side surface of band 62 on the opposite side thereof from the housing shoulder 64. Spring 66 acts as a return spring for the piston 56.

When brake-actuating pressure is impressed into chamber 54, piston 56 moves to the right and since band 62 is press fitted thereon, the band also moves to the right against the force of the Belleville spring 66. When the resistance to movement of band 62 becomes sufficiently high, usually with the Belleville spring 66 flattened against the shoulder 68, further movement of the band is effectively prevented. The brake apply pressure in chamber 54 is sufficiently high to move the piston further to the right if the brakes are not fully applied at this point. Thus the piston moves relative to the band 62 with a slipping action occurring between the press fitted surfaces. This has the effect of moving the band 62 to the left relative to the piston 56. When the pressure in chamber 54 is relieved, the Belleville spring 66 acts against the band 62 and therefore also against the piston 56, moving both of them to the left until the end surface of band 62 engages housing shoulder 64. This establishes the new adjusted position of the piston 56.

As in the construction shown in FIG. 1, the piston surface 60 is provided with relief recesses 70 which permit the press fitting of band 62 on the piston without requiring extremely close tolerances.

I claim:

1. An apply piston adjuster comprising:

a housing having a chamber formed therein and receiving an apply piston, said piston being adapted to be moved axially outwardly of said chamber by pressurized fluid in said chamber to actuate a mechanism;

said piston having a circumferentially and axially extending surface formed thereon having circumferentially spaced recesses dividing said surface into a plurality of areas;

a cylinder member press fitted into engagement with said plurality of areas with said recesses providing radial accommodation for the circumferential areas of said cylinder member covering said recesses;

stop means on said housing engaging said cylinder member upon a predetermined allowable axially outward movement of said piston and said cylinder member, said stop means then preventing further axially outward movement of said cylinder 37 member; and further axially outward movement of said piston causing slipping of said cylinder member relative to said piston while maintaining a press fit, said cylinder member engaging other stop means on said housing upon axially inward return movement of said piston and said cylinder member and thereby stopping said piston and said cylinder member at a new adjusted position.

2. The adjuster of claim 1, said cylinder member being a band press fitted on an outer circumferential surface area of said piston.

3. The adjuster of claim 2 further comprising a Belleville spring in said housing and forming a part of said stop means and having a peripheral edge thereof engaging said cylinder member and when compressed by axially outward piston and cylinder member movement reaching a position preventing further cylinder member movement, said Belleville spring providing a return force moving said piston and said cylinder member axially inward to the adjusted position upon release of fluid pressure in said chamber.

4. The adjuster of claim 1, said cylinder member having a flange formed thereon and extending radially of said cylinder member and engaging said housing stop means to provide the adjusting action.

5. The adjuster of claim 1, said cylinder member being pressed fitted into an inner circumferential surface of said piston.

6. The adjuster of claim 5, said cylinder member having an outwardly turned flange formed thereon and engaging said housing stop means to provide the adjusting action.